(12) United States Patent

Stephenson et al.

(10) Patent No.: US 7,313,102 B2
(45) Date of Patent: Dec. 25, 2007

(54) SYSTEM AND METHOD FOR SUBNET CONFIGURATION AND SELECTION

(75) Inventors: Bryan Craig Stephenson, Alviso, CA (US); Jennifer Jie Fu, San Jose, CA (US); Julie Kosakowski, Fort Collins, CO (US); Samuel L. Scarpello, Jr., Windsor, CO (US); Andrea Eakin, Fort Collins, CO (US); Jon Russell Sawyer, Fort Collins, CO (US); Rheid Schloss, Fort Collins, CO (US); Ron MacDonald, Tucson, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1030 days.

(21) Appl. No.: 10/390,492

(22) Filed: Mar. 17, 2003

(65) Prior Publication Data

US 2004/0184412 A1  Sep. 23, 2004

(51) Int. Cl.
*H04L 12/26* (2006.01)
*H04L 12/28* (2006.01)

(52) U.S. Cl. .................................... 370/254; 370/351

(58) Field of Classification Search .................. None
See application file for complete search history.

(56) References Cited

U.S. PATENT DOCUMENTS

| 5,845,091 | A | * | 12/1998 | Dunne et al. | 709/240 |
|---|---|---|---|---|---|
| 5,963,207 | A | * | 10/1999 | Brewer et al. | 715/810 |
| 5,968,126 | A | * | 10/1999 | Ekstrom et al. | 709/225 |
| 6,308,148 | B1 | * | 10/2001 | Bruins et al. | 703/27 |
| 6,480,900 | B1 | * | 11/2002 | Habert | 709/245 |
| 6,532,217 | B1 | * | 3/2003 | Alkhatib et al. | 370/252 |
| 2003/0069954 | A1 | * | 4/2003 | Ma et al. | 709/223 |

OTHER PUBLICATIONS

J. Mogul and J. Postel,Request for Comments: 950, "Internet Standard Subnetting Procedure" Aug. 1985, pp. 1-18.

* cited by examiner

*Primary Examiner*—Edan Orgad
*Assistant Examiner*—Blanche Wong (57) ABSTRACT

One embodiment disclosed relates to a method for provisioning subnets. The subnets are grouped into subnet groups based on logical properties of the subnets. Each network consumer is assigned those subnet groups that are accessible to that network consumer. The network consumer is then provided with an interface for constrained selection of a particular subnet.

17 Claims, 13 Drawing Sheets

SYSTEM AND METHOD FOR SUBNET CONFIGURATION AND SELECTION

BACKGROUND OF THE INVENTION

1. Field of the Invention

The present invention relates generally to computing and networking. More particularly, the present invention relates to managing network addresses.

2. Description of the Background Art

Internet protocol (IP) addresses may be sectioned off or grouped together into subnets (short for "subnetworks") for management purposes. Such subnet are described further in Request for Comments (RFC) 950 and other documents from the Internet Engineering Task Force (IETF) (see http://ietf.org on the World Wide Web). Per RFC 950, subnets "are logically visible sub-sections of a single Internet network." A subnet is typically associated with an identifiable separate part of an organization's network infrastructure.

In the context of the following discussion, the "network manager" and the "network consumer" are both information technology (IT) administrators. The network manager refers to someone who administers the network and its resources (including physical resources, like devices, and virtual resources, like IP addresses). The network consumer is not the end-user of the corporate network, but instead refers to one who is, for example, setting up a group of systems to provide a service on the corporate network.

As determined by the inventors, currently available tools to manage IP address spaces have various problems and disadvantages. First, these tools are focused on the network manager, and the network manager must still interact heavily with the network consumers to ensure that the consumers choose appropriate address space. Considerable time of the network managers and network consumers is currently wasted with tedious tasks such as determining the IP address and network mask of an available subnet that meets the network consumers' requirements. Second, these tools only manage the address space itself; they do not manage other inter-related characteristics. For example, performance and security characteristics are not managed.

Third, these tools are separate and apart from an automated provisioning system. Such automated provisioning systems are utilized to create infrastructure on behalf of the IT personnel. Fourth, subnet usage is typically accounted for manually in a separate step. Such manual accounting is needed to take into account the fluctuation over time of subnet utilization, but the manual accounting is error prone.

The above-described problems and disadvantages may be overcome by utilizing embodiments of the present invention.

SUMMARY

One embodiment of the invention pertains to a method for provisioning subnets. The subnets are grouped into subnet groups based on logical properties of the subnets. Each network consumer is assigned those subnet groups that are accessible to that network consumer. The network consumer is then provided with an interface for controlled selection of a particular subnet.

Another embodiment of the invention relates to a system for provisioning subnets. The system includes a subnet provisioner and a user interface coupled to the subnet provisioner. The subnet provisioner groups the subnets into subnet groups based on logical properties of the subnets and assigns a set of accessible subnet groups to each network consumer. The user interface provides for selection by the network consumer of a particular subnet from those subnets in the set of accessible subnet groups.

Another embodiment of the invention relates to a data center. The data center includes data center resources to be allocated and managed and controller software configured to manage virtualized pools of the data center resources. The controller software includes a subnet provisioning component that groups the subnets into subnet groups based on logical properties of the subnets, assigns to each network consumer those subnet groups that are accessible to that network consumer, and provides for controlled selection of a particular subnet by a network consumer.

DETAILED DESCRIPTION

Embodiments of the present invention enable higher-level grouping of subnets and intelligent presentation and selection of these subnets to personnel who create and manage IT infrastructure.

In accordance with an embodiment of the present invention, a new tool is provided which enables the network manager (hereinafter sometimes referred to as "manager") to arbitrarily group subnets together under any logical scheme into named subnet groups and to assign those named subnet groups to groups of (or individual) network consumers (hereinafter sometimes referred to as "consumers"). By this assignment of subnet groups to the network consumers, the network manager may control the network consumers' visibility of the subnet groups. The visibility may be controlled by making each subnet group visible to (and accessible by) either an individual consumer, or all current and future consumers, or an arbitrary group of consumers as determined by the manager.

In accordance with another embodiment of the invention, a graphical user interface and back-end processing is provided for network consumers to provision subnets into an IT infrastructure. The consumers can examine which subnet groups are available to them, and which subnets within those groups are available to them. By using such an interface and back-end processing, network consumers are enabled to easily control certain subnet characteristics. For example, the consumers may control the device which routes traffic to the subnet. Network consumers can thus select a subnet which meets their requirements (for example, based upon required performance, security, or other network characteristics) without the need to contact the network manager.

The system for provisioning subnets in accordance with an embodiment of the invention may be implemented as part of an automated solution which provisions infrastructure on behalf of IT personnel. In recent years, a revolutionary alternative has been offered in the form of a data center that behaves like a "computing utility." Such a data center may be called a "utility" data center. A utility data center hides the data center's actual platform architecture and provides for customers a much simpler and more convenient higher-level virtual architecture. Such a utility data center is available from the Hewlett Packard Company (HP) with various offices around the world, including Cupertino, Calif. The HP Utility Data Center is a scalable, programmable solution that automates the creation, monitoring, and metering of a wide variety of computing environments. The abstractions that live on this infrastructure may be called "farms." The resulting customized computing environments support the industry needs listed above and drive down the total cost of ownership of the solution.

Figure 1:
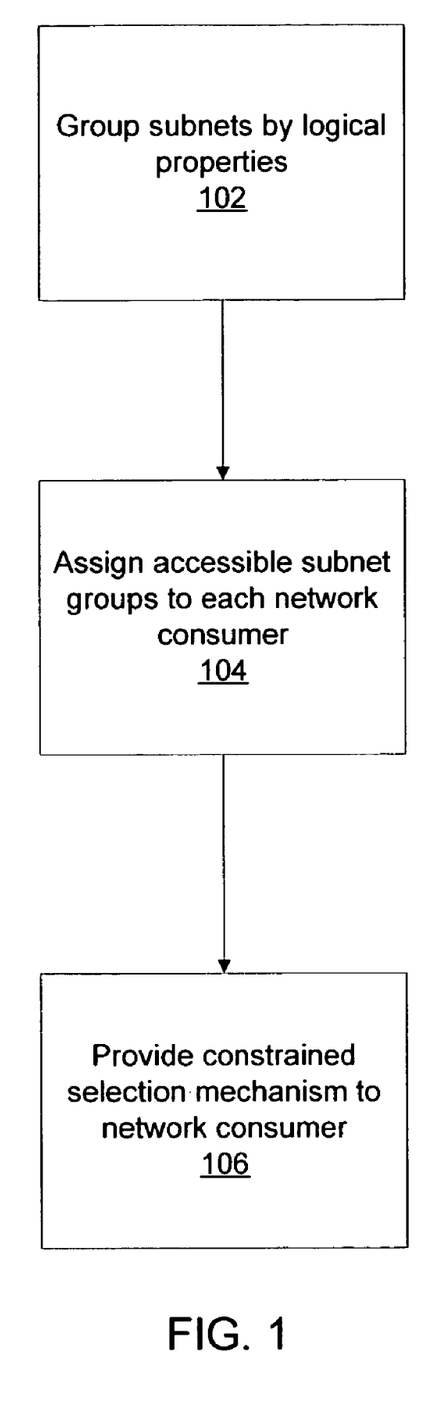
FIG. 1 is a flow chart depicting a method for provisioning subnets in accordance with an embodiment of the invention.

FIG. 1 is a flow chart depicting a method for provisioning subnets in accordance with an embodiment of the invention. The method 100 as depicted includes at least three basic steps 102, 104 and 106.

Figure 2:
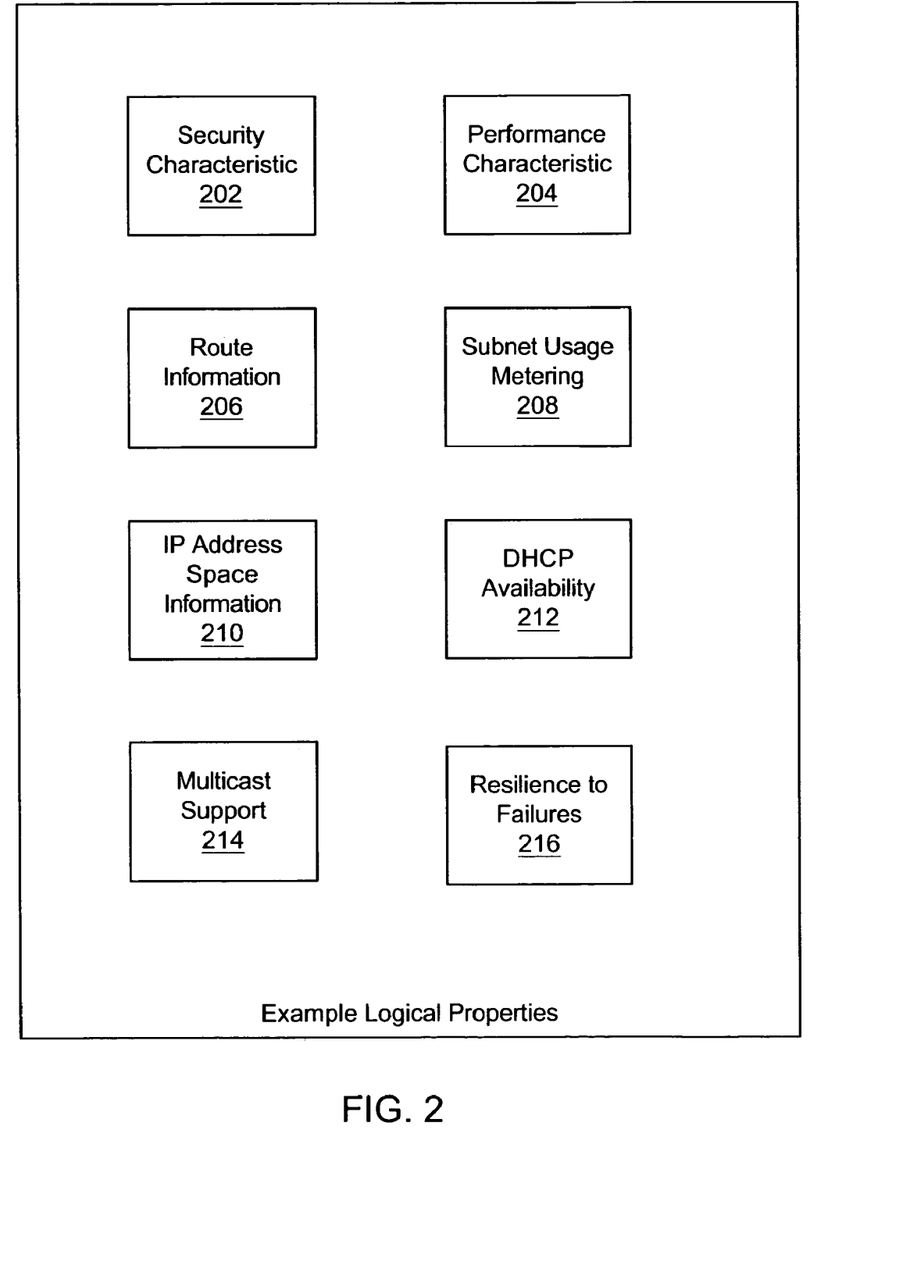
FIG. 2 depicts example logical properties that may be used for subnet grouping in accordance with an embodiment of the invention.

In the first step 102, subnets are grouped into subnet groups based on logical properties of the subnets. FIG. 2 depicts example logical properties that may be used for subnet grouping in accordance with an embodiment of the invention. The example logical properties may include one or more of the following: a security characteristic 202 of a subnet group; a performance characteristic 204 of a subnet group; route information 206 of a subnet group; subnet usage metering 208; Internet protocol (IP) address space information 210; the availability or not of dynamic host configuration protocol (DHCP) 212 in a subnet group; the availability of multicasting support 214 in a subnet group; and resilience to failures 216.

In the second step 104, each network consumer is assigned those subnet groups that are accessible to that network consumer. For example, those subnet groups that are accessible to each network consumer may be constrained by a workgroup type of that network consumer. Workgroup types may include, for example, human resources, finance, administration, engineering, and so on. In another example, the accessible subnet groups may be assigned individually to each network consumer by a network manager.

In the third step 106, a mechanism is provided for the constrained selection of a particular subnet by a network consumer. The mechanism may comprise a graphical user interface with selectable fields. The constrained selection may comprise a selection process, for example, such as depicted in FIG. 3.

In accordance with an embodiment of the invention, usage by network consumers of public subnets is automatically tracked, metered, and reported. This may be done by the system without requiring additional network manager or network user actions.

Figure 3:
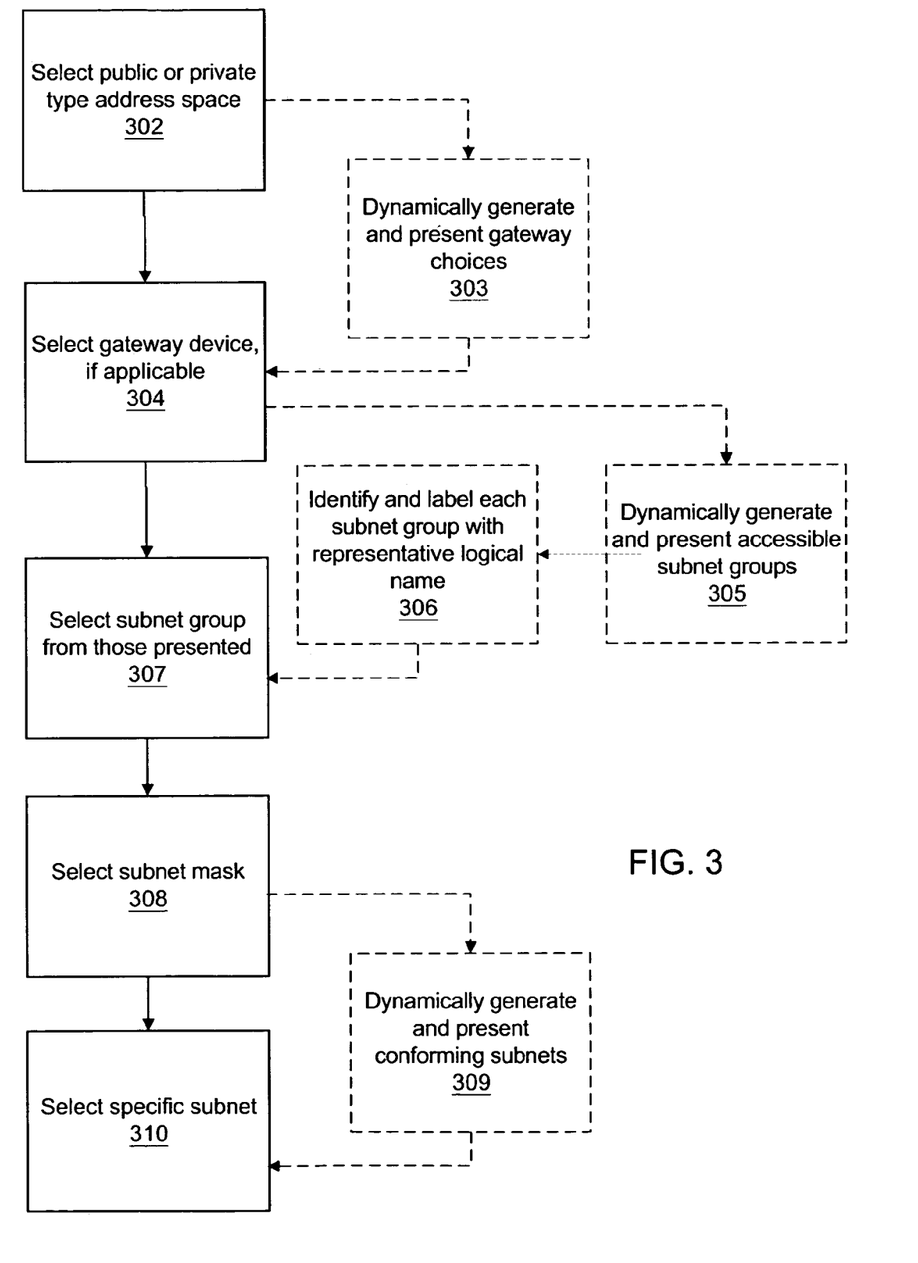
FIG. 3 depicts a selection process that includes various selection and supporting steps in accordance with an embodiment of the invention.

FIG. 3 depicts a selection process that includes various selection and supporting steps in accordance with an embodiment of the invention. These steps are now described. Each of the selection steps may be performed by the network consumer through use of a graphical user interface with selectable fields.

The first selection step 302 involves the network consumer selecting a public or private type of address space. A public address space includes globally unique IP addresses out of an Internet registry. A private address space includes IP addresses that are locally unique but are not routable over the public Internet.

The second selection step 304, if applicable, involves the network consumer selecting a gateway device from amongst those gateway devices that are accessible to the network consumer. If the network consumer selected a private address space in the first selection step 302, then no gateway device need necessarily be selected. On the other hand, if the network consumer selected a public address space, then a gateway device through which traffic is routed to the subnet may be selected. A gateway is not selected for a public outside or internet facing subnet (connected to the Virtual Router). In order to facilitate this selection, the choices from which the network consumer has to select the gateway device are dynamically generated and presented 303 in accordance with current availability and policies set by the network manager.

The third selection step 306 involves the network consumer selecting a subnet group. Only those subnet groups which are accessible to the network consumer and which satisfy the previous selections are dynamically determined and presented 305 for selection. In regards to 'previous selections' above, the subnet group list does not depend on the gateway selection. A subnet group can contain both public and private addresses or no addresses. Therefore, all subnet groups that are assigned to a consumer's account are listed. To facilitate the selection by the network consumer, each of the accessible subnet groups may be identified and labeled 306 by a logical name representative of the logical properties of that subnet group. For example, a high performance and high security group of subnets may be so indicated in its name.

The fourth selection step 308 involves the network consumer selecting a subnet mask that represents the size of the subnet being selected. A subnet mask (as defined in RFC 950) is used in the creation of a subnet to mask part of the IP address to define the network number and host number portions.

Finally, the fifth selection step 310 involves the network consumer selecting a specific subnet (i.e. a specific IP address that determines the precise IP address space of the subnet). To facilitate this selection, the system dynamically generates and presents 309 those subnets which conform to the following criteria: i) the subnets were configured into the selected subnet group by the network manager; ii) the subnets have the selected subnet mask; iii) the subnets have the selected public or private type of address space; and iv) traffic is routable to the subnet via the selected gateway device, if any.

At each step of the way in the above-described process 300, the choices available to the network consumer are intelligently constrained or limited. They are limited to the set of choices which make sense, based upon current availability, topology of the farm network, and/or the policies which the network manager determined.

The fifth selection step 310 may be eliminated if the network consumer does not care to specify the specific IP address of the subnet being selected. In that case, for example, the specific IP address of the subnet may be automatically selected by the system from amongst those subnets that conform to the other selections.

The fourth 308 and fifth 310 selection steps may be eliminated if the network consumer does not care about either the subnet mask or the specific subnet IP address. In this case, a subnet mask and subnet IP address may be automatically selected by the system from amongst those subnets that conform to the other selections.

Consider the following illustrative example. A network manager is responsible for one site in a large enterprise network. The manager configures four subnet groups named as follows:

1. High-security high-speed group
2. High-security low-speed group
3. Normal-security high-speed group
4. Normal-security low-speed group The network manager creates several subnets and places each of them into the appropriate group, based upon the security and performance characteristics of each subnet within the corporate network.

The network manager has four network consumers, named Joe, Jill, Fred, and Jane, for purposes of discussion. In this example, the manager makes all groups of subnets available to Joe and Jill. The manager makes only groups 1 and 2 available to Fred. Only groups 2 and 4 are made available by the manager to Jane.

As a network consumer, Fred uses the graphical user interface to provision some IT infrastructure. The manager has only allowed Fred to see the high security groups of subnets (numbers 1 and 2 in this example) because Fred is working on a high security project. Fred will only see these subnet groups presented in the user interface, and will thus be guaranteed to choose one of the high security subnets which the manager has configured. When a farm is actually activated using a high security subnet, the activation will be automatically detected and tracked until the farm is deactivated or reconfigured not to use the high security subnet. The high security subnet is then automatically returned to the free pools of subnets for reuse.

Various advantages are realized in accordance with an embodiment of the invention. A network manager is enabled to allocate the subnets to various network consumers and also to reserve subnets for particular consumers if so desired. The manager is allowed to organize the subnets into logical groups, which can be based on various characteristics of the subnets. The manager is also enabled to enforce limitations on which subnets and/or subnet groups certain customers may use when deploying IT infrastructure. The network consumer is enabled to much more easily choose a subnet which matches his or her requirements. Rather than being presented with hundreds or thousands of subnets from which to choose which are identified only by their IP address and subnet mask, the network consumer follows an organized and logical process in choosing the subnet.

In accordance with an embodiment of the invention, network consumers are enabled to create IT infrastructure on a corporate network that complies with the corporation's policies without consulting the network manager. If the consumer desires a subnet of a specified mask and subnet group that does not currently exist, this may be communicated via portal user interface selections and provisioned automatically. No alternative communication is required to set up an additional subnet in the group, and subnet address space may be automatically split when necessary.

In accordance with an embodiment of the invention, the state of the subnets (used or available) is tracked. Upon deactivation of the IT infrastructure which uses the subnets, subnets are automatically returned to the free pool. Embodiments of the invention may further provide an accounting of actual subnet usage by network consumers. The accounting may be implemented using a form of automated metering or mediation. Such automated metering or mediation occurs automatically, that is without requiring actions from the network manager or network consumer. For example, the mediation may be completed daily, with reports generated that may be used as input to billing systems and/or for examining historical customer resource usage.

Figure 4A:
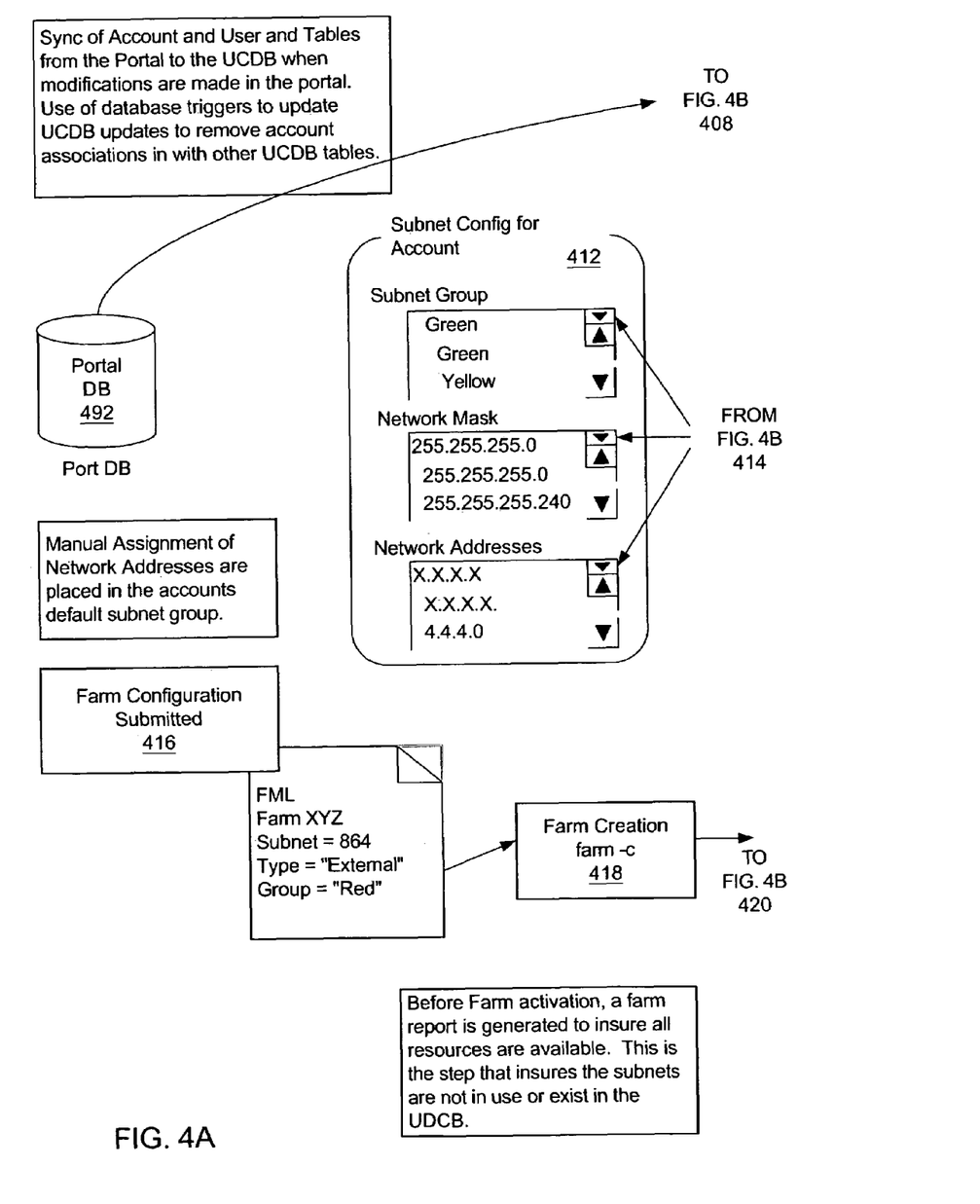
FIG. 4 is a schematic diagram illustrating a system for provisioning subnets in accordance with an embodiment of the invention.
Figure 4B:
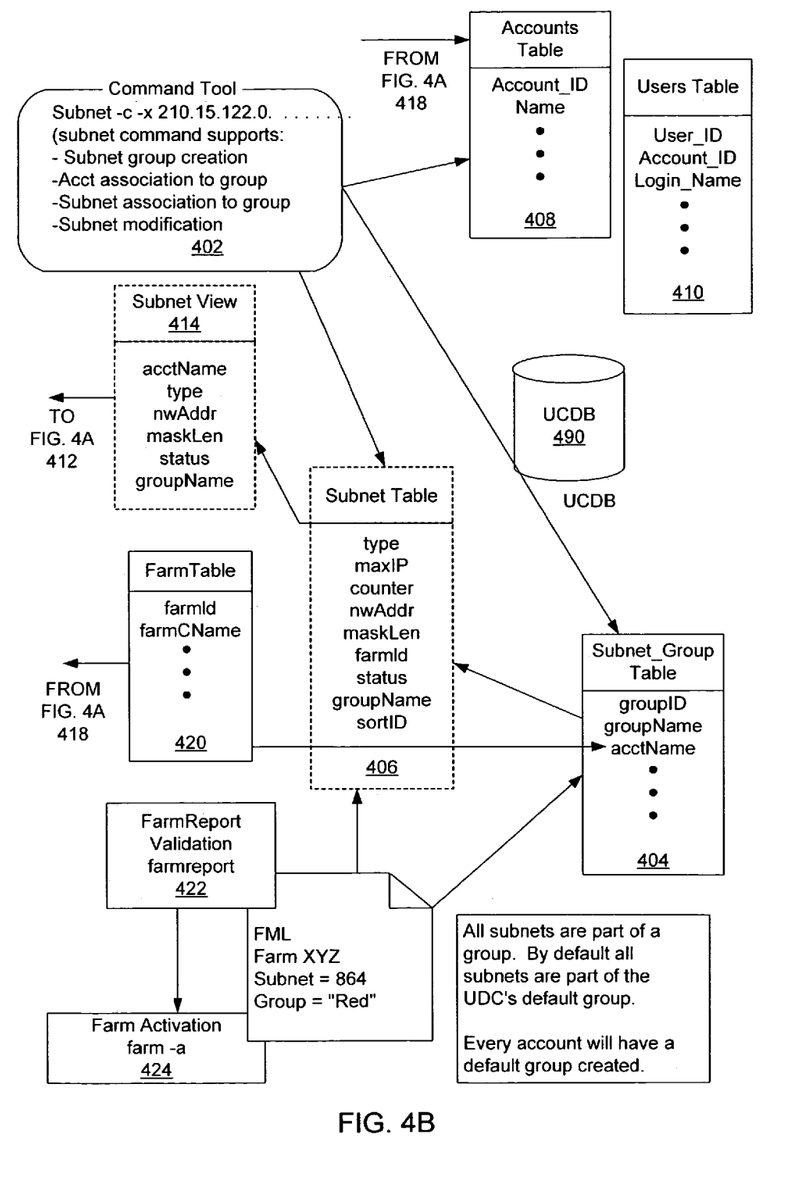

FIG. 4 is a schematic diagram illustrating a system for provisioning subnets in accordance with an embodiment of the invention. This specific embodiment is designed to operate as a part of a utility computing infrastructure, such as the Utility Data Center from Hewlett-Packard. Other embodiments may operate as part of other infrastructure systems.

The operation of the system of FIG. 4 is now further described with reference to several "use cases." These use cases, of course, are not exhaustive, but rather serve as examples illustrating the operation of the system.

Figure 5A:
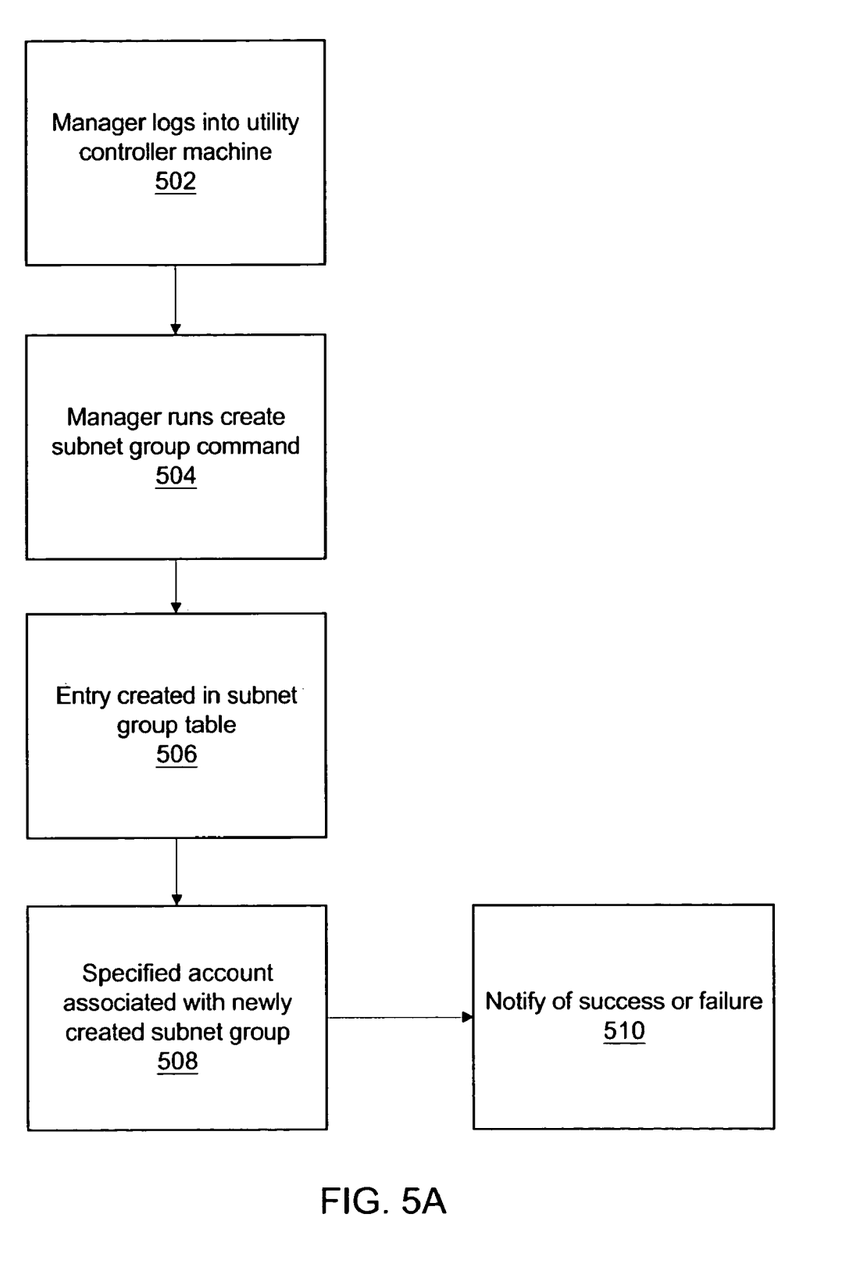
FIG. 5A is a flow chart depicting a first use case in accordance with an embodiment of the invention.

In a first use case, as depicted in FIG. 5A, a data center administrator (DCA) creates a subnet group. The DCA is an example of a "network manager" in the terminology above. In a preliminary step, the DCA has an account on a utility controller (UC) machine and logs into 502 the UC machine. Once logged into the UC machine, the DCA runs 504 a command in a command tool to create 402 a subnet group, specifying the subnet group name and the account name. The command creates 506 an entry in a subnet group table 404 for the newly created subnet group and also associates 508 the specified account with this subnet group. The association may be accomplished using an account name field in the subnet group table 404. Finally, notification of the success or failure of the command is sent 510 to the DCA.

In accordance with an embodiment of the invention, a utility controller database (UCDB) 490 may be used to store and manage the subnet group table 404, a subnet table 406, an accounts table 408, a users table 410, and other tables.

Figure 5B:
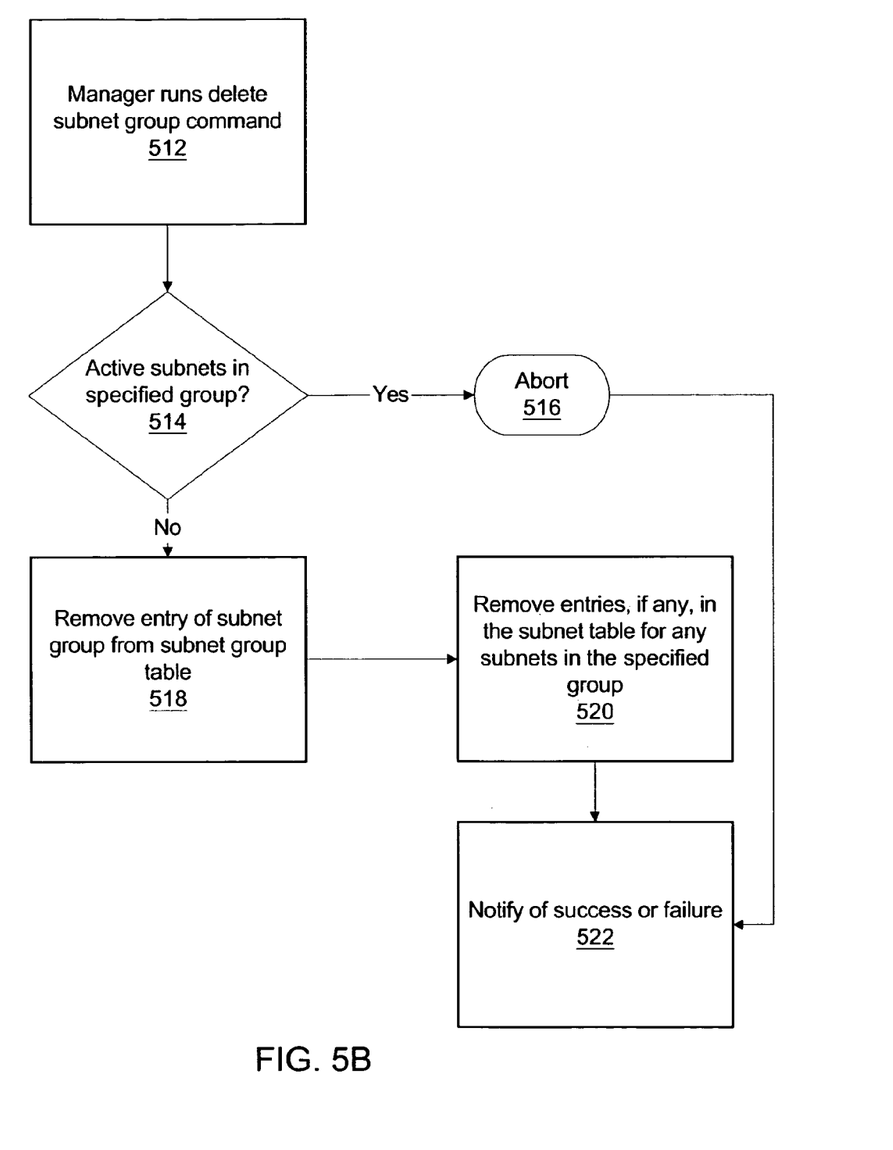
FIG. 5B is a flow chart depicting a second use case in accordance with an embodiment of the invention.

In a second use case, as depicted in FIG. 5B, the DCA or network manager deletes a subnet group. Once logged onto a UC machine, the DCA runs 512 a command in the command tool 402 to delete a subnet group, specifying the subnet group name and the account name. The delete subnet group command checks 514 to see if any subnet in the specified group is active, and the command aborts 516 with no action taken if any subnet in the group is active. An error message is generated upon such a command abortion. Otherwise, the system removes 518 the entry of the subnet group from the subnet group table. In addition, entries, if any, are removed 520 from the subnet table 406 for any subnets in the specified subnet group that is being deleted. Finally, notification of the success or failure of the command is sent 522 to the DCA.

Figure 5C:
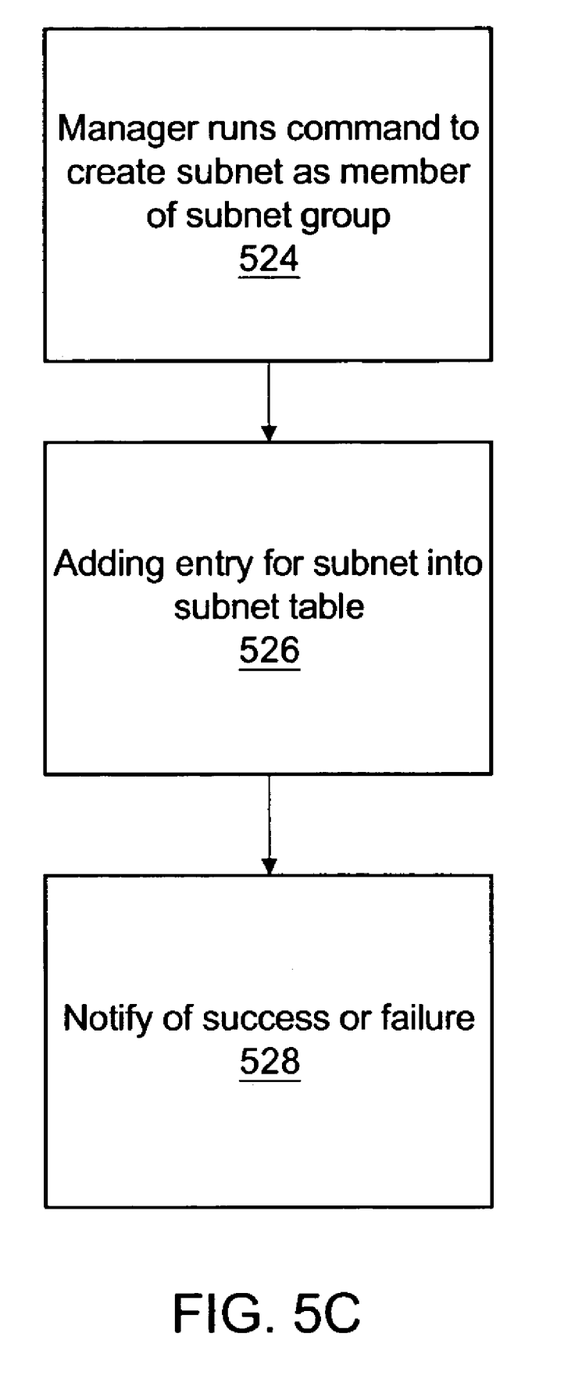
FIG. 5C is a flow chart depicting a third use case in accordance with an embodiment of the invention.

In a third use case, as depicted in FIG. 5C, the DCA or network manager creates a subnet as a member of an existing subnet group. Once logged onto a UC machine, the DCA runs 524 a command in the command tool 402 to create a subnet as a member of a subnet group, specifying the subnet group name, the account name, and the subnet being created (including network mask, IP address, and type of subnet). The specified subnet is created as a member of the specified subnet group by adding 524 an entry in the subnet table 406. Finally, notification of the success or failure of the command is sent 526 to the DCA.

For example, suppose that a DCA wanted to create a subnet group with four subnets: a) ip 15.75.123.64, mask 29; b) ip 15.75.123.72, mask 29; c) ip 15.75.123.128, mask 28; and d) ip 15.75.123.144, mask 28. The DCA would first create the subnet group (see the first use case), then would run the create subnet command (see the third use case) four times, once to create each of the four subnets.

Figure 5D:
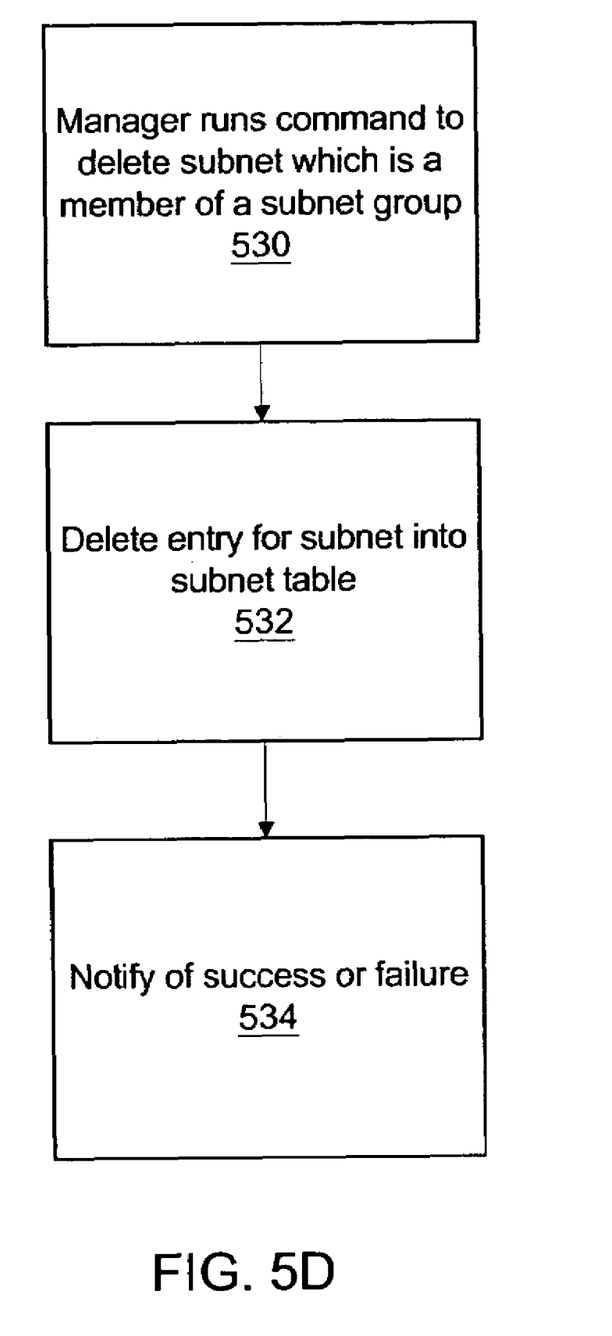
FIG. 5D is a flow chart depicting a fourth use case in accordance with an embodiment of the invention.

In a fourth use case, as depicted in FIG. 5D, the DCA or network manager deletes a subnet from an existing subnet group. Once logged onto a UC machine, the DCA runs 530 a command in the command tool 402 to delete a subnet as a member of a subnet group, specifying the subnet group name, the account name, and the subnet being deleted (including network mask and IP address). The specified subnet is removed as a member of the specified subnet group by deleting 532 an entry in the subnet table 406. Finally, notification of the success or failure of the command is sent 534 to the DCA.

Figure 5E:
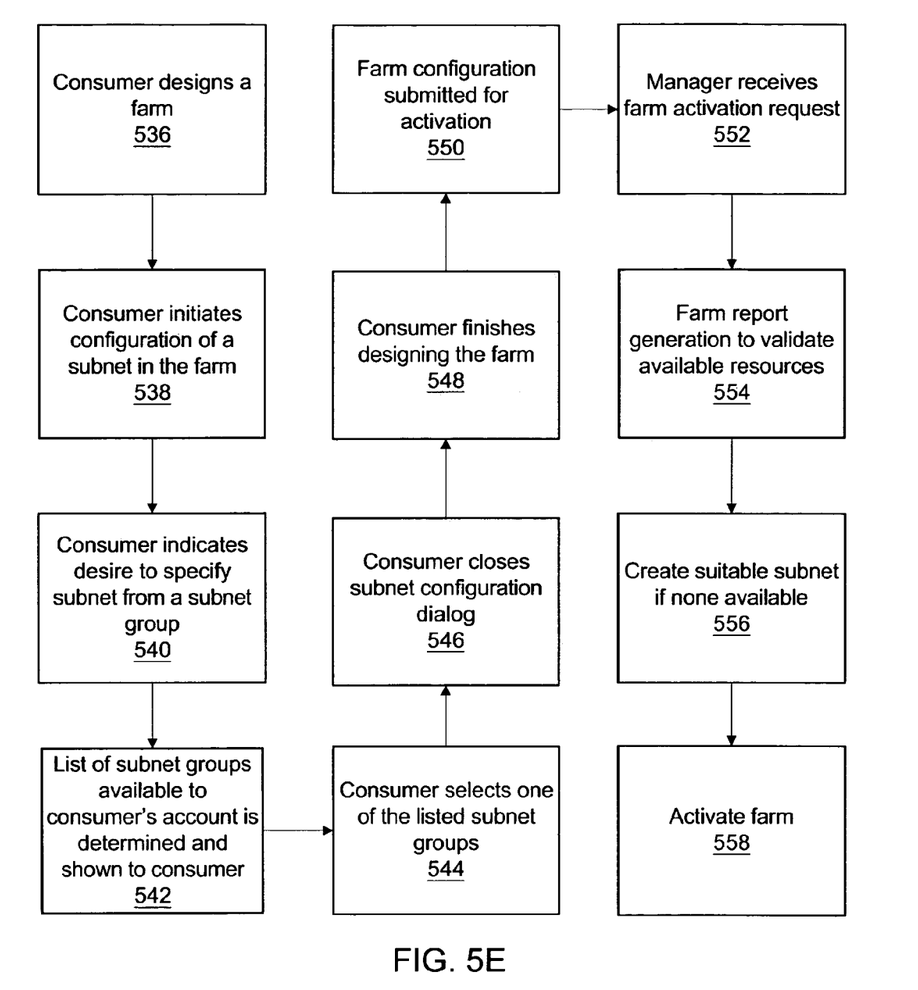
FIG. 5E is a flow chart depicting a fifth use case in accordance with an embodiment of the invention.

In a fifth use case, as depicted in FIG. 5E, a farm administrator (FA) specifies the group membership for a farm subnet. The FA is an example of a "network consumer" in the terminology above. In this use case, neither the network mask nor IP address are specified. The FA designs 536 a farm. Designing of the farm may take place, for example, using a utility controller portal that utilizes a portal database (portal DB or portDB) 492. Using such a portal, the FA may initiate 538 the configuration of a subnet in the farm, for instance, by right-clicking on a subnet icon on a screen to bring up a subnet configuration dialog 411. The FA may indicate 540 that he or she wants to specify the subnet from a subnet group. A list of subnet groups that are available to the FA's account may then be shown 542. This list may be determined by subnet view support software 414 querying the UCDB 490. The FA then selects 544 one of the listed subnet groups to be used for this subnet and closes 546 the subnet configuration dialog. The FA finishes 548 designing the farm, and the farm configuration is submitted 550. Per FIG. 4, submission 416 of the farm configuration leads to farm creation 418 which may be done by way of adding to a farm table 420.

The DCA receives 552 the activation request, and a farm report 422 is generated 554 to validate available resources. The farm report shows available subnets, if any, for subnet groups used by the farm. It is determined as to whether or not the specified subnet group(s) has (have) any available subnet. If no available subnet appears, then the DCA may create 556 a suitable subnet as a member of the specified subnet group(s). If there is an available subnet, then the DCA may activate 558 (424 in FIG. 4) the farm. During the farm activation, the utility controller selects an available subnet from the specified subnet group to use for the physical subnet for the farm.

Figure 5F:
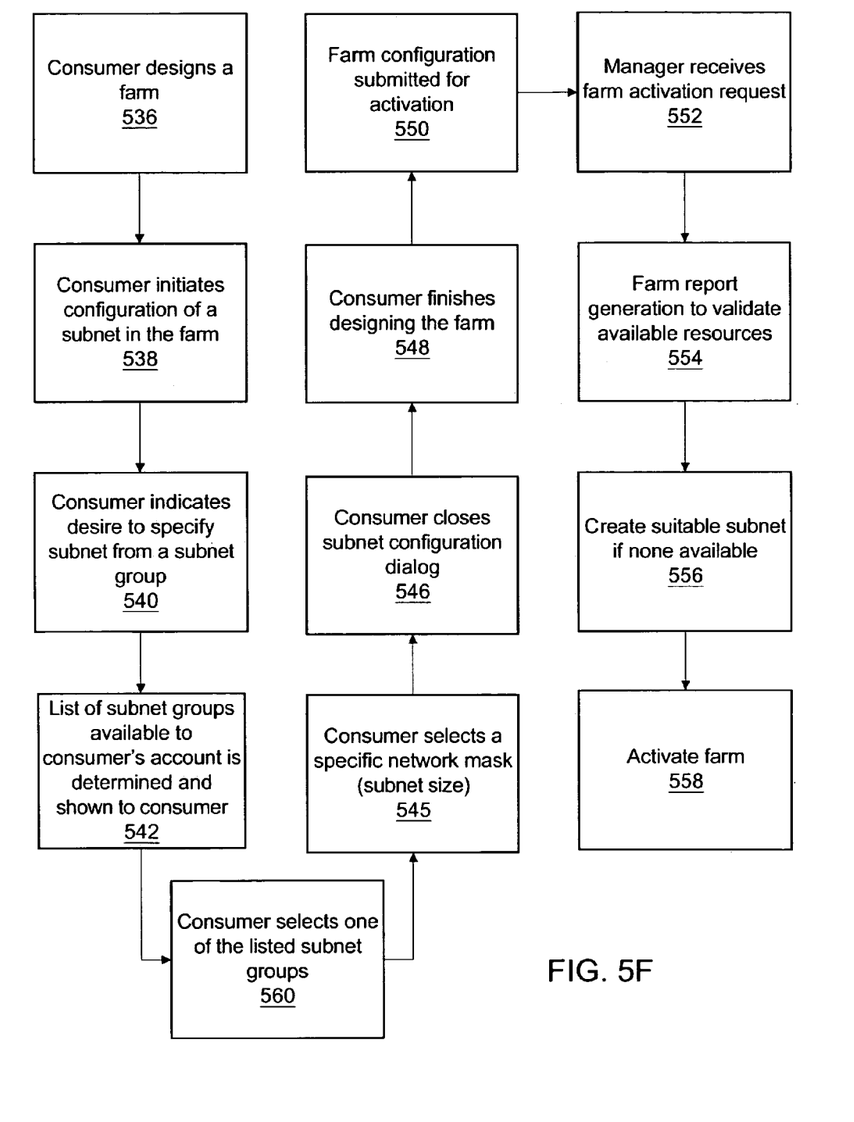
FIG. 5F is a flow chart depicting a sixth use case in accordance with an embodiment of the invention.

A sixth use case, as depicted in FIG. 5F, is similar to the fifth use case of FIG. 5E. In the sixth use case, a farm administrator (network consumer) specifies explicitly the subnet group and the subnet mask for a farm subnet, but does not specify the IP address. In this case, an additional step occurs after the FA selects 544 a subnet group. In the additional step, the FA chooses 560 the network mask that is desired for this subnet. For example, the FA may do this when the FA needs a subnet from a specific subnet group and of a specific size, but the FA does not care about which specific address space will be provisioned.

Figure 5G:
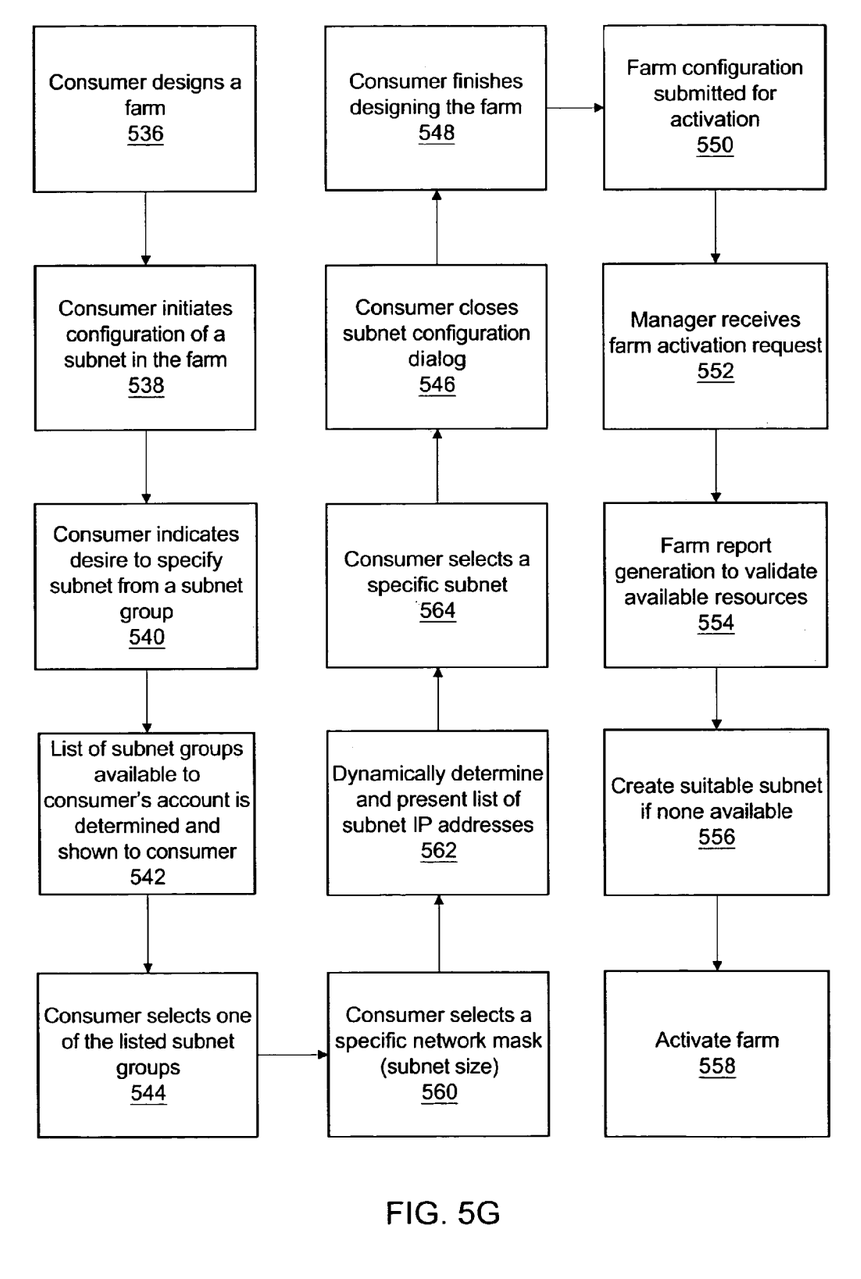
FIG. 5G is a flow chart depicting a seventh use case in accordance with an embodiment of the invention.

A seventh use case, as depicted in FIG. 5G, is similar to the sixth use case of FIG. 5F. In the seventh use case, a farm administrator (network consumer) specifies explicitly the subnet group, the subnet mask, and the particular subnet to use for the physical subnet for the farm. In this case, two additional steps 562 and 564 occur after the FA selects a specific network mask 560. In the first additional step, a list of subnet IP addresses is dynamically generated and presented 562. The list may be dynamically generated by querying a UCDB 490 to obtain those available subnet IP addresses which have the specified mask and are in the specified subnet group. The list may be presented by, for example, populating the choices in a selection box of a graphical user interface. In the second additional step, the FA selects 564 one of the subnet IP addresses from the list.

Figure 6:
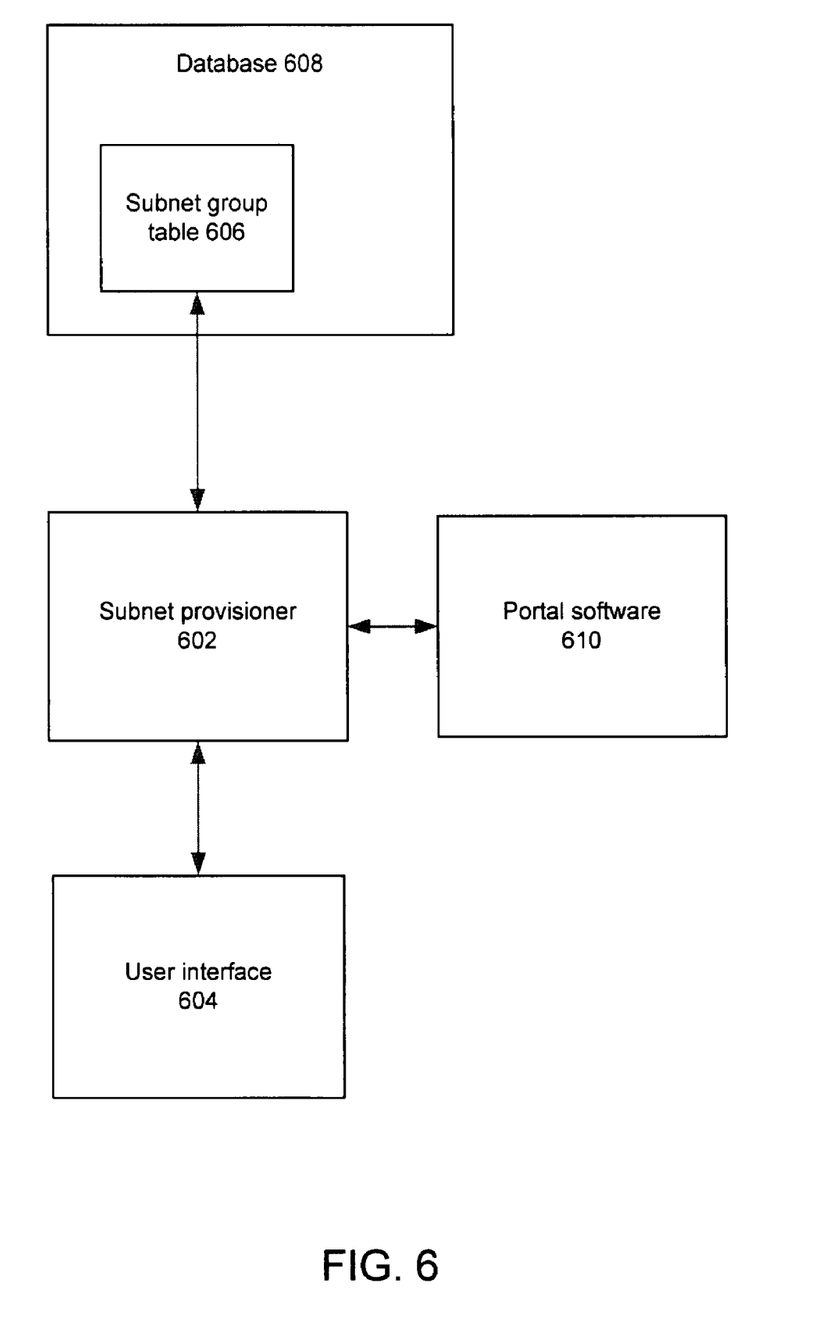
FIG. 6 is a schematic diagram illustrating a system for provisioning subnets in accordance with an embodiment of the invention.

FIG. 6 is a schematic diagram illustrating a system for provisioning subnets in accordance with an embodiment of the invention. The system for provisioning subnets comprises: a subnet provisioner 602 for grouping the subnets into subnet groups based on logical properties of the subnets and for assigning a set of accessible subnet groups to a network customer; a user interface 604 coupled to the subnet provisioner 602 for selection by the network consumer of a particular subnet from those subnets in the set of accessible subnet groups; a subnet group table 606 in a database 608 configured to be accessed by the subnet provisioner 602; and portal software 610 coupled to the subnet provisioner 602 for use by the network consumer in provisioning a subnet without requiring actions or consultations from a network manager.

Embodiments of the present invention solve various problems. Instead of wasting time of both the network manager and network consumer, the network consumer can simply specify that he or she wants an available subnet, for example, with high performance and high security characteristics, without bothering the network manager. The network consumer no longer needs to worry about supernetting, multinetting, complex details of network security policy, or other complexities that they may not fully understand. In other words, network consumers are enabled to create information technology (IT) infrastructure on the corporate network that comply with the corporation's policies without consulting the network manager. In addition, IP address space management is considerably simplified and enhanced. Subnet address space may be split automatically when needed, and further may be grouped and named logically. The subnet address space may be provisioned by network consumers without the need for interaction with the network manager. Furthermore, errors in choosing an inappropriate or in-use subnet for new infrastructure are made less likely. This speeds time-to-solution and reduces rework. Also, error prone manual accounting of subnet usage may be eliminated. Such manual accounting previously was required as a separate step as utilization of subnets by network consumers fluctuated over time.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for provisioning subnets, the method comprising:
   grouping the subnets into subnet groups based on logical properties of the subnets;
   assigning to each network consumer those subnet groups that are accessible to that network consumer; and
   providing for constrained selection of a particular subnet by a network consumer accomplished by way of a graphical user interface with selectable fields, wherein the constrained selection includes (i) selecting a public or private type address space, (ii) if applicable, selecting a gateway device from amongst those gateway devices that are accessible to the network consumer, and (iii) selecting a subnet group from those subnet groups that are accessible to the network consumer, and (iv) selecting a subnet mask that represents a size of the particular subnet.

2. The method of claim 1, wherein each of the accessible subnet groups is identified by a logical name representative of the logical properties of that group.

3. The method of claim 1, wherein the constrained selection further includes:
   presenting IP addresses for those subnets from the selected subnet group that are available for use and that conform to the selected subnet mask, the selected type of address space, and the selected gateway device, if any.

4. The method of claim 1, wherein those subnet groups that are accessible to each network consumer is constrained by a workgroup type of that network consumer.

5. The method of claim 1, wherein the logical properties include a security characteristic of a subnet group.

6. The method of claim 1, wherein the logical properties include a performance characteristic of a subnet group.

7. The method of claim 1, wherein the logical properties include route information of a subnet group.

8. The method of claim 1, wherein the logical properties include support for subnet usage metering.

9. The method of claim 1, wherein the logical properties include Internet protocol address space information.

10. The method of claim 1, wherein the logical properties include availability of dynamic host configuration protocol in a subnet group.

11. The method of claim 1, wherein the logical properties include support of multicasting in a subnet group.

12. A system for provisioning subnets, the system comprising:
   a subnet provisioner for grouping the subnets into subnet groups based on logical properties of the subnets and for assigning a set of accessible subnet groups to a network consumer;
   a user interface coupled to the subnet provisioner for selection by the network consumer of a particular subnet from those subnets in the set of accessible subnet groups;
   a subnet group table in a database configured to be accessed by the subnet provisioner, wherein the subnet provisioner retrieves data from and updates the subnet group table; and
   portal software coupled to the subnet provisioner for use by the network consumer in provisioning a subnet without requiring actions or consultations from a network manager.

13. The system of claim 12, wherein the subnet group table keeps track of used/unused subnets, enabling the network consumer to choose a subnet that is not already in use, and eliminating need for a network manager to be involved therein.

14. The system of claim 12, wherein the user interface includes a mechanism for selecting a subnet group from the set of accessible subnet groups.

15. The system of claim 14, wherein each of the accessible subnet groups is identified in the user interface by a logical name representative of the logical properties of that group.

16. The system of claim 14, wherein the user interface further includes a mechanism for selecting a subnet mask that represents a size of the particular subnet and also a mechanism for presenting those subnets from the selected subnet group that conform to: the selected subnet mask; the selected type of address space; and the selected gateway device, if any.

17. The system of claim 12, wherein the logical properties utilized by the subnet provisioner comprise at least one property from a group of properties including: a security characteristic of the subnet groups; a performance characteristic of the subnet groups; route information of the subnet groups; support for subnet usage metering; IP address space information; availability of dynamic host configuration protocol in the subnet groups; and support of multicasting in the subnet groups.

* * * * *